Inventors
Elroy J. Bryant
Charles A. Fling
By their Attorney

United States Patent Office 3,302,228
Patented Feb. 7, 1967

3,302,228
METHODS OF LASTING SHOES
Elroy J. Bryant, Cincinnati, Ohio, and Charles A. Fling, Manchester, N.H., assignors to United Shoe Machinery Corporation, Boston, Mass., a corporation of New Jersey
Filed Feb. 2, 1965, Ser. No. 429,864
5 Claims. (Cl. 12—145)

This invention relates to the manufacture of shoes and particularly to a novel and improved method of lasting the end portions of shoes.

In the manufacture of shoes, it is a common practice to shape the upper at an end portion of a shoe to the end portion of a last, for example, by means including wipers which stretch the upper materials snugly around the last and, while maintaining the upper in such condition, for example, by means of an end embracing band, to wipe the lasting margin of the upper inwardly over and to press it against the bottom face of an insole on the last thus to secure the lasting margin in lasted position by adhesive previously applied to the inner side of the lasting margin, and/or as is especially the case where thermoplastic adhesive is used, to the bottom face of the insole. In order that the shape thus imparted to the end portion of the upper will be faithfully maintained in the finished shoe, additional stiffness may be provided by means of a so-called end stiffener e.g. a box toe or a counter stiffener) associated with the end portion of the upper and which, in accordance with the novel method disclosed and claimed in a copending application for U.S. Letters Patent Serial No. 338,705, filed January 20, 1964, in the names of Adolph M. Chaplick and Conrad Rossitto, may comprise a layer of flexible resilient thermoplastic stiffening material adhered to the inner side of the end portion of the upper.

As indicated above, when thermoplastic adhesive is utilized for securing the lasting margin of the upper to the insole in lasting position, such adhesive is usually applied to the bottom of the end portion of the insole prior to the assembly of the upper and insole on a last. Thereafter, this adhesive is heat activated and put in a pressure flowable condition for adhesive wetting engagement, i.e. rendered tacky and capable of adhesively bonding the lasting margin to the insole under pressure, by application of heat thereto just before the lasting margin of the upper is wiped inwardly over and pressed against the bottom of the insole. Such activation of the thermoplastic adhesive on the insole is frequently effected by means of a heated member arranged to be brought into direct physical contact with the adhesive, just before the wipers are advanced and closed, and which is subsequently retracted to a position out of the path of the wipers. The foregoing procedure, while generally satisfactory, does require the extra time and labor of the separate operation of applying the thermoplastic adhesive to the insole and necessarily involves some waste of the adhesive which must be so applied as to assure sufficient adhesive on the insole to accommodate the widest lasting margin likely to be encountered in a run of shoes. Moreover, the heated iron will tend to steal away some adhesive as it is withdrawn from contact therewith after actuation.

It is an object of this invention to provide a novel and improved method of lasting the end portion of the upper of a shoe whereby the aforementioned difficulties are avoided while at the same time a very efficient and effective lasting operation is assured. With this object in view, it is proposed to apply to the lasting margin of the end portion of the upper an adherent layer of thermoplastic adhesive which is non-tacky at ambient temperature, and then after the upper and an insole have been assembled on a last and the end portions of the upper shaped to the end portion of the last, simultaneously to wipe the lasting margin of the upper inwardly over and to press it against the bottom of the insole while applying sufficient heat directly to the surface of the layer of adhesive to render it tacky and capable of forming an adhesive bond under pressure for securing the lasting margin to the insole in lasted position. More particularly, and in accordance with a feature of the invention, there is applied to the inside surface of the end portion of the upper including the lasting margin thereof an adherent layer of flexible resilient thermoplastic stiffening material which while having adhesive qualities when heated is non-tacky at ambient temperature and the upper and layer of stiffening material are subjected to the action of moisture laden heated air, at a temperature below that at which the material becomes tacky, to condition the upper and to soften the stiffening material before the end portion of the upper is shaped to the end portion of the last. Preferably, and in accordance with another feature of the invention, just before the wipers are advanced and closed, the exposed bottom surface of the end portion of the insole is heated, for example, by the application of a heated member thereto, so that during the wiping of the lasting margin inwardly and the pressing of it against the insole, sufficient additional heat will be applied directly to the surface of the layer of stiffening material, on the lasting margin only of the end portion of the upper to render it tacky and capable of forming an adhesive bond under pressure for securing the lasting margin to the insole in lasted position as they are pressed together by the wipers.

The above and other objects and features of the invention will appear in the following detailed description with reference to the accompanying drawings, and will be pointed out in the claims.

Figure 1:
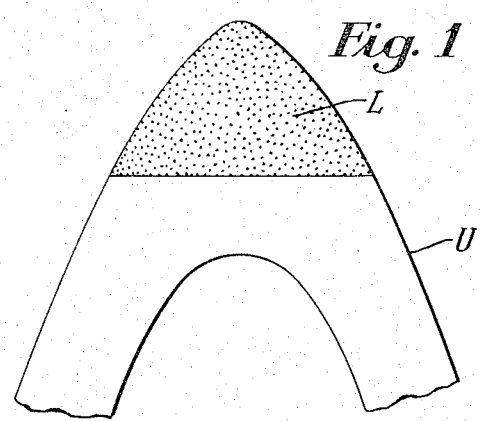
FIG. 1 is a plan view of the vamp portion of the upper of a shoe to the end portion of which a layer of stiffening material has been applied.

Referring to these drawings, the vamp portion of each upper U, FIG. 1, is provided with an adherent layer L of flexible resilient thermoplastic stiffening material in accordance with the novel method disclosed and claimed in the above-mentioned copending application, this layer, however, now being extended out to, or nearly to, the marginal edge of the toe end of the vamp so as to cover at least a substantial portion of the lasting margin of the toe end of the vamp.

Figure 2:
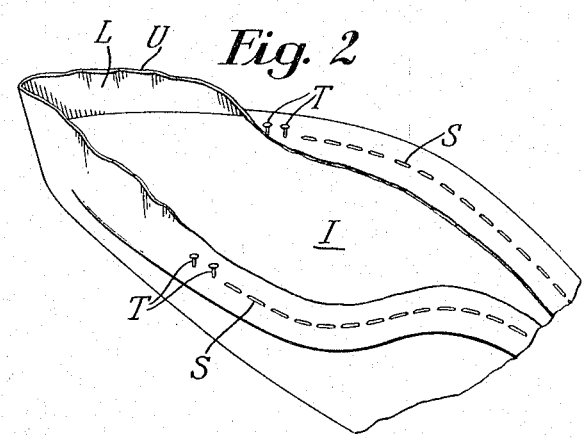
FIG. 2 is a perspective view of the end portion of a shoe comprising a vamp portion similar to that shown in FIG. 1, the upper having been assembled on a last, pulled over and side lasted.

After the vamp portion has been stitched to a quarter portion, not shown, the upper is assembled on a last together with an insole I, pulled over and side lasted in the usual manner. As illustrated in FIG. 2, the upper is secured in lasted position along the sides of the shoe by means of staples S, S and in pulled over position at the toe end by pulling over tacks T, T, the pulling over tack provided at the extreme toe end having been removed in accordance with the usual practice to facilitate the subsequent conditioning of the toe end of the upper prior to the toe lasting operation.

Figure 3:
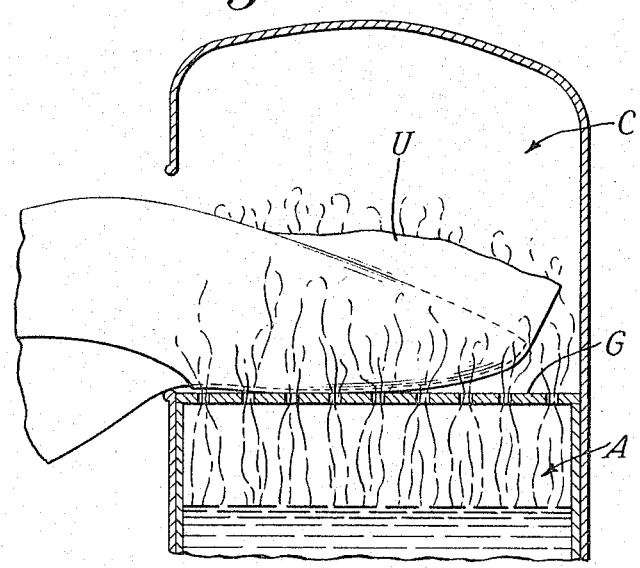
FIG. 3 is a view showing the shoe in an apparatus for subjecting the upper at the toe end to the action of heated moisture laden air.

Next, the toe end of the upper U is subjected to the action of moisture laden heated air in a conventional toe steaming apparatus illustrated diagrammatically in FIG. 3. It will be understood that this apparatus comprises an upper chamber C in which the toe end of the shoe is inserted and a lower chamber A adapted to contain a quantity of water which is heated and thus caused to deliver heated moisture laden air upwardly through a grid G to the upper chamber C. For the purposes of this invention, the heated moisture laden air delivered to the chamber C is maintained at a temperature somewhat lower than that at which the layer L of stiffening material will become tacky, i.e. actuated and capable of forming an adhesive bond when pressed against the insole, but still sufficiently elevated properly to condition the upper and also to soften the stiffening material somewhat thus to facilitate the subsequent lasting operation. Also, this preheating of the stiffening material on the lasting margin facilitates the subsequent activation during the lasting operation.

Figure 4:
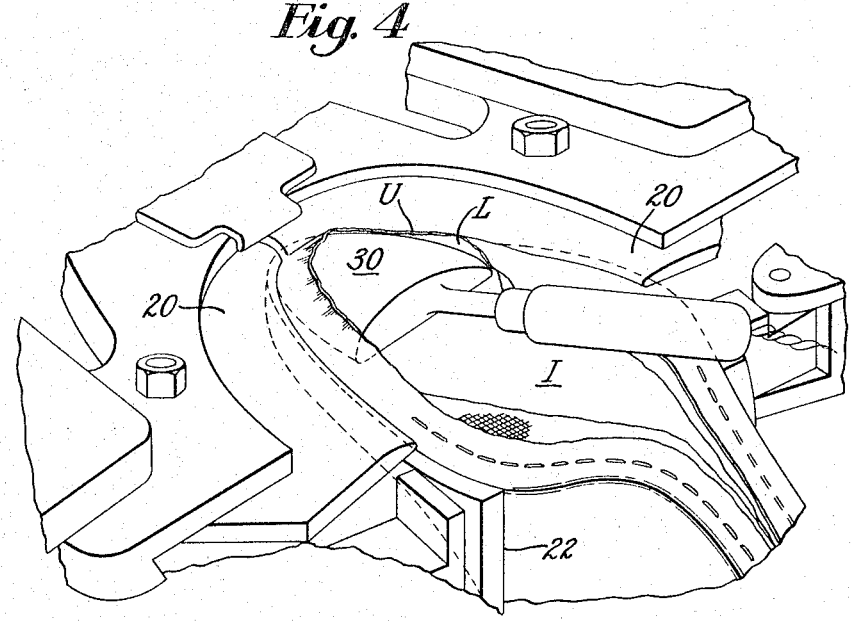
FIG. 4 is a perspective view of the end portion of the shoe shown in FIG. 2 after the end of the upper has been shaped to the last by the wipers of a bed lasting machine and just as the wipers are about to be advanced and closed.
Figure 5:
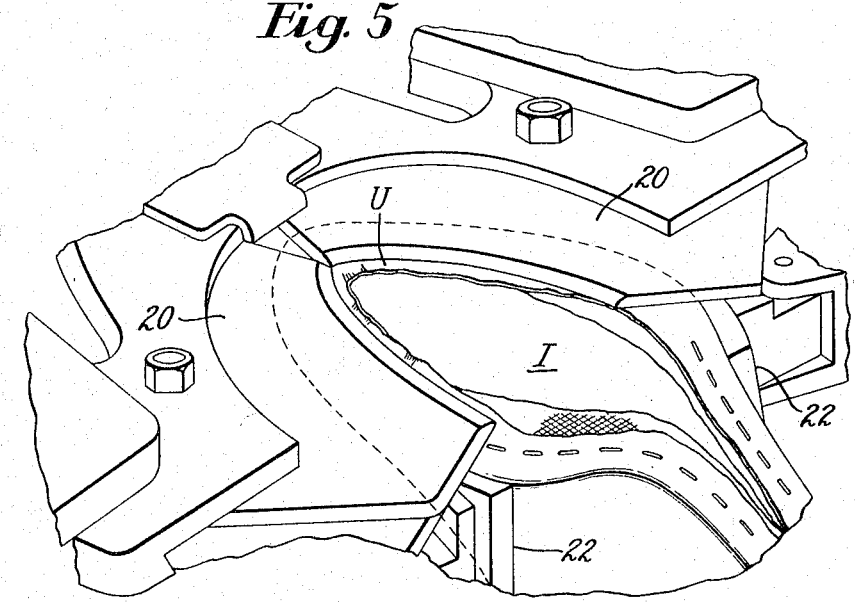
FIG. 5 is a perspective view similar to FIG. 3 but showing the wipers of the bed lasting machine after they have been advanced and closed.

In FIGS. 4 and 5 of the drawings, the toe lasting operation is illustrated as being carried out in a bed lasting machine of the well-known type disclosed in U.S. Patent No. 1,284,870, issued November 12, 1918, in the name of Matthias Brock, this machine being provided with the usual toe lasting wipers 20, 20 and a toe band 22. As will be readily understood by those skilled in the art, the upper at the toe end of the shoe is first shaped to the toe end of the last by means of the wipers 20, 20 and is then held in such condition by the toe band 22 before and while the wipers are being advanced and closed to wipe the lasting margin of the toe end of the upper U inwardly over and to press it against the bottom of the insole I.

Just before the operator of the bed lasting machine begins to advance and close the wipers, he places a heated iron 30 in direct contact with the exposed surface of the toe end of the insole I thus heating this surface to a temperature sufficient to render that portion of the layer of the stiffening material L on the lasting margin of the upper tacky, i.e., capable of adhesively securing the lasting margin to the insole as it is wiped inwardly over and pressed against this surface by the wipers. The heated iron may be permitted to rest on the insole for a brief time interval and then be entirely removed just before the wipers are advanced and closed, or if the operator so desires, he may gradually retract the heated iron simultaneously with the initial advancing and closing movements of the wipers, thus causing it to function somewhat as a retarder, removing the iron entirely as the advancing and closing movements are completed. In this manner, sufficient additional heat is applied directly to the surface of the layer of adhesive on the lasting margin of the toe end of the upper, from the heated surface of the insole alone or from this heated surface and from contact with the heated iron, to render the layer of stiffening material tacky and capable of forming an adhesive bond under pressure for securing the lasting margin to the insole in lasted position.

As stated above, the shaping of the upper to the last during the lasting operation is facilitated by the action of the heated moisture laden air on the upper and also on the stiffening material L. However, inasmuch as the temperature of the heated moisture laden air is not high enough to render the stiffening material tacky, no particular care or special treatment is required by the bed lasting operator during the toe lasting operation. Moreover, any danger of the toe end of the upper on which the stiffening layer L has been applied, adhering to the last is eliminated. By thus utilizing the stiffening material also as the lasting adhesive, the extra expense, time and labor involved in the separate insole operation is avoided while the benefits of stiffening the toe end of the upper by such an applied layer of stiffening material are also obtained.

Having described the invention what is claimed as new and desired to secure by Letters Patent of the United States is:

1. A method of lasting the end portion of a shoe which comprises the steps of applying to the inside surface of the lasting margin of an end portion of the upper of a shoe an adherent layer of thermoplastic adhesive which at ambient temperature is non-tacky, assembling the upper with an insole on a last, subjecting the upper and layer of adhesive to the softening action of moisture laden heated air at a temperature below that at which the adhesive becomes tacky, shaping the said end portion of the upper to the end portion of the last, heating the exposed surface of the end portion of the insole, and simultaneously wiping the lasting margin of the upper inwardly over and pressing it against the heated surface of the insole thereby applying sufficient additional heat directly to the surface of the said layer of adhesive to render the adhesive tacky and capable of forming an adhesive bond under pressure for securing the lasting margin to the insole in lasted position as they are pressed together by the wipers.

2. A method of lasting the end portion of a shoe which comprises the steps of applying to the inside surface of an end portion of the upper of a shoe, including the lasting margin thereof, an adherent layer of thermoplastic stiffening material which at ambient temperature is non-tacky, assembling the upper with an insole on a last, subjecting the upper and layer of stiffening material to the softening action of moisture laden heated air at a temperature below that at which the material becomes tacky, shaping the said end portion of the upper to the end portion of the last, and simultaneously wiping the lasting margin of the upper inwardly over and pressing it against the bottom of the insole while applying sufficient additional heat directly to the surface of said layer of stiffening material on the lasting margin only of the end portion of the upper to render the stiffening material tacky and capable of forming an adhesive bond under pressure for securing the lasting margin to the insole in lasted position as they are pressed together by the wipers.

3. A method of lasting the end portion of a shoe which comprises the steps of applying to the inside surface of an end portion of the upper of a shoe including the lasting margin thereof, an adherent layer of thermoplastic stiffening material which at ambient temperature is non-tacky, assembling the upper with an insole on a last, subjecting the upper and layer of stiffening material to the softening action of moisture laden heated air at a temperature below that at which the adhesive becomes tacky, shaping the said end portion of the upper to the end portion of the last, heating the exposed surface of the end portion of the insole, and simultaneously wiping the lasting margin of the upper inwardly over and pressing it against the heated surface of the insole thereby applying sufficient additional heat directly to the surface of said layer of stiffening material on the lasting margin only of the end portion of the upper to render the stiffening material tacky and capable of forming an adhesive bond under pressure for securing the lasting margin to the insole in lasted position as they are pressed together by the wipers.

4. A method of lasting a portion of a shoe which comprises the steps of applying to the inside surface of a portion of an upper of a shoe, including the lasting margin thereof, an adherent layer of thermoplastic stiffening material which at ambient temperature is non-tacky, assembling the upper with an insole on a last, subjecting the upper and layer of stiffening material to the softening action of moisture-laden heated air at a temperature below that at which the material becomes tacky, shaping the said portion of the upper to a portion of the last, simultaneously wiping the lasting margin of the upper inwardly over and pressing it against the bottom of the insole while applying sufficient heat directly to the surface of said layer of stiffening material on the lasting margin only of said portion of the upper to render said material tacky and capable of forming an adhesive bond under pressure for securing the lasting margin to the insole in lasted position as they are pressed together by the wipers.

5. A method of lasting a portion of a shoe which comprises the steps of applying to the inside surface of a portion of an upper of a shoe, including the lasting margin thereof, an adherent layer of thermoplastic stiffening material which at ambient temperature is non-tacky, assembling the upper with an insole on a last, subjecting the upper and layer of stiffening material to the softening action of moisture-laden heated air at a temperature below that at which the material becomes tacky, shaping the said portion of the upper to a portion of the last, heating the exposed surface of a portion of the insole and simultaneously wiping the lasting margin of the upper inwardly over and pressing it against the heated surface of the insole thereby applying sufficient heat directly to the surface of said layer of stiffening material on the lasting margin only of said portion of the upper to render the stiffening material tacky and capable of forming an adhesive bond under pressure for securing the lasting margin to the insole in lasted position as they are pressed together by the wipers.

References Cited by the Examiner
UNITED STATES PATENTS

| | | | |
|---|---|---|---|
| 1,809,364 | 6/1931 | Tweedie | 12—145 |
| 1,919,657 | 7/1933 | Kamborian | 12—145 |
| 2,104,228 | 1/1938 | Kamborian | 12—145 |
| 2,206,900 | 7/1940 | King | 12—145 |
| 2,235,887 | 3/1941 | Kamborian | 12—145 |
| 2,970,331 | 2/1961 | Gaquin | 12—59.5 |

PATRICK D. LAWSON, *Primary Examiner.*